US012700674B2

(12) United States Patent
Wu et al.

(10) Patent No.: US 12,700,674 B2
(45) Date of Patent: Aug. 4, 2026

(54) ANTENNA ASSEMBLY AND ANTENNA ARRAY

(71) Applicant: PEGATRON CORPORATION, Taipei City (TW)

(72) Inventors: Chien-Yi Wu, Taipei City (TW); Tse-Hsuan Wang, Taipei City (TW); Chih-Fu Chang, Taipei City (TW); Hsin-Feng Hsieh, Taipei City (TW); Wu-Hua Chen, Taipei City (TW); Chih-Wei Liao, Taipei City (TW); Chao-Hsu Wu, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 47 days.

(21) Appl. No.: 18/679,295

(22) Filed: May 30, 2024

(65) Prior Publication Data

US 2025/0087888 A1 Mar. 13, 2025

(30) Foreign Application Priority Data

Sep. 7, 2023 (TW) ................................ 112134122

(51) Int. Cl.
*H01Q 9/04* (2006.01)
*H01Q 1/48* (2006.01)
*H01Q 21/06* (2006.01)
*H01Q 21/24* (2006.01)

(52) U.S. Cl.
CPC ............ *H01Q 9/0414* (2013.01); *H01Q 1/48* (2013.01); *H01Q 21/065* (2013.01)

(58) Field of Classification Search
CPC .......... H01Q 1/22; H01Q 1/2283; H01Q 1/38; H01Q 1/48; H01Q 9/04; H01Q 9/0407; H01Q 9/0414; H01Q 9/045; H01Q 9/0457; H01Q 9/042; H01Q 13/10; H01Q 13/106; H01Q 21/065; H01Q 21/24
See application file for complete search history.

(56) References Cited

U.S. PATENT DOCUMENTS 5,043,738 A * 8/1991 Shapiro ................ H01Q 9/0457 343/700 MS
5,241,321 A * 8/1993 Tsao ..................... H01Q 9/0442 343/848
6,054,953 A * 4/2000 Lindmark ............ H01Q 9/0407 343/846

(Continued)

FOREIGN PATENT DOCUMENTS

CN 103975483 8/2014

*Primary Examiner* — Thai Pham
(74) *Attorney, Agent, or Firm* — J.C. PATENTS

(57) ABSTRACT

An antenna assembly includes a patch antenna, a metal layer, and a feed-in signal layer. The metal layer is disposed on a side of the patch antenna and includes a first slot and a second slot. The feed-in signal layer is disposed on a side of the metal layer opposite the second antenna and includes a transmitting port, a receiving port, a hybrid coupler, and two microstrips. The transmitting port and the receiving port are connected to the hybrid coupler, and the two microstrips are extended in the direction away from the hybrid coupler. Projections of two ends of the two microstrips onto the metal layer are overlapped with the first slot and the second slot. An antenna array is also mentioned.

11 Claims, 20 Drawing Sheets

(56) References Cited

U.S. PATENT DOCUMENTS

| | | | | |
|---|---|---|---|---|
| 7,626,549 | B2 * | 12/2009 | Channabasappa | H01Q 9/0457<br>343/846 |
| 11,145,983 | B1 * | 10/2021 | Tarng | H01Q 13/18 |
| 2014/0253400 | A1 * | 9/2014 | Tiezzi | H01Q 21/065<br>343/770 |
| 2016/0094091 | A1 * | 3/2016 | Shin | H01Q 1/248<br>307/104 |
| 2020/0168997 | A1 * | 5/2020 | Liu | H01Q 9/0414 |
| 2021/0098894 | A1 * | 4/2021 | Haviv | H01Q 21/062 |
| 2021/0257739 | A1 * | 8/2021 | Mathews | H01Q 9/0457 |
| 2024/0388001 | A1 * | 11/2024 | Huang | H01Q 21/24 |

* cited by examiner

ANTENNA ASSEMBLY AND ANTENNA ARRAY

CROSS-REFERENCE TO RELATED APPLICATION

This application claims the priority benefit of Taiwan application serial no. 112134122, filed on Sep. 7, 2023. The entirety of the above-mentioned patent application is hereby incorporated by reference herein and made a part of this specification.

BACKGROUND

Technical Field

The present disclosure relates to an antenna assembly and an antenna array, and in particular to an antenna assembly and an antenna array that perform transmitting and receiving functions simultaneously.

Description of Related Art

Nowadays, antennas have been commonly adopted in various applications. With the advancement of science and technology, diverse requirements are set for antennas. How to enable the antenna to perform both transmitting and receiving functions while the antenna signal has circular polarization characteristics has always been an issue to be solved in the field.

SUMMARY

The present disclosure provides an antenna assembly, which performs both transmitting and receiving functions, and the antenna signal of such antenna assembly has circular polarization characteristics.

The present disclosure provides an antenna array, which includes the antenna assembly.

An antenna assembly of the present disclosure includes a second patch antenna, a metal layer and a feed-in signal layer. The metal layer is disposed on a side of the second patch antenna and includes a first slot and a second slot, wherein the main extension direction of the first slot is orthogonal to the main extension direction of the second slot. The feed-in signal layer is disposed on a side of the metal layer opposite the second patch antenna and includes a transmitting port, a receiving port, a hybrid coupler and two microstrips. The transmitting port and the receiving port are connected to the hybrid coupler, and the two microstrips extend from the hybrid coupler in a direction away from the hybrid coupler. Projections of two ends of the two microstrips onto the metal layer are overlapped with the first slot and the second slot.

In an embodiment of the present disclosure, the antenna assembly further comprises a first patch antenna disposed on another side of the second patch antenna opposite the metal layer.

In an embodiment of the present disclosure, each of the above-mentioned first slot and second slot includes a slit and two holes with symmetrical shapes disposed at both ends of the slit. The width of each of the two holes is greater than the width of the slit. The shape of each hole includes a polygon, a circle or an ellipse.

In an embodiment of the present disclosure, the second patch antenna is surrounded by a metal loop structure. The metal loop structure and the second patch antenna are located on the same plane and separated from each other. The metal loop structure includes a plurality of metal units arranged at equal intervals.

In an embodiment of the present disclosure, the feed-in signal layer further includes a filter connected between the receiving port and the hybrid coupler.

In an embodiment of the present disclosure, the feed-in signal layer further includes ground conductive via zone surrounding the transmitting port, the hybrid coupler and the two microstrips.

In an embodiment of the present disclosure, the antenna assembly further includes a plurality of first conductive vias and at least one wiring layer and at least one first ground layer located on a side of the feed-in signal layer opposite the metal layer. The plurality of first conductive vias are connected to the metal layer and the at least one first ground layer.

In an embodiment of the present disclosure, the antenna assembly further includes a second ground layer, which is disposed between the feed-in signal layer and at least one first ground layer and includes a first opening and a second opening, the first opening and the second opening correspond to the first slot and the second slot respectively.

In an embodiment of the present disclosure, the antenna assembly further includes a plurality of second conductive vias surrounding the two microstrips and connected to the metal layer and the second ground layer.

An antenna array of the present disclosure includes a plurality of first antenna assemblies and a plurality of second antenna assemblies, and the plurality of first antenna assemblies and the plurality of second antenna assemblies are arranged in an array. Each of the first antenna assemblies and the second antenna assemblies is the antenna assembly as described above, wherein the main extension direction of the first slot of each first antenna assembly is orthogonal to the main extension direction of the first slot of each second antenna assembly, and the relative position of the transmitting port and receiving port of each first antenna assembly is opposite the relative position of the transmitting port and receiving port of each second antenna assembly.

In an embodiment of the present disclosure, the antenna array is arranged in multiple columns, the plurality of first antenna assemblies are located in odd-numbered columns of the multiple columns, and the plurality of second antenna assemblies are located in even-numbered columns of the multiple columns.

In an embodiment of the present disclosure, the plurality of first antenna assemblies and the plurality of second antenna assemblies are alternately arranged in columns and rows.

Based on the above, according to the present disclosure, by disposing a hybrid coupler on the feed-in signal layer, the antenna assembly generates feed-in signals with a phase difference of 90 degrees, thereby enabling the transmitting port and the receiving port to have circular polarization characteristics. In addition, in the antenna assembly, through the projections, overlapped with the first slot and the second slot, of two ends of the two microstrips onto the metal layer, the feed-in signal may be coupled to the second patch antenna via the first slot and the second slot on the metal layer after the signal from the transmitting port passes the hybrid coupler and generates left-hand polarization and right-hand polarization, and finally the signal is transmitted to the first patch antenna. Other way around, the reception signal received from the first patch antenna is coupled to the feed-in signal layer through the first slot and the second slot on the metal layer after passing the second patch antenna, and is then transmitted to the receiving port through the hybrid coupler. Such design allows the antenna assembly to perform both transmitting and receiving functions, and the antenna signal has circular polarization characteristics, so the antenna assembly has good performance.

DESCRIPTION OF THE EMBODIMENTS

Figure 1:
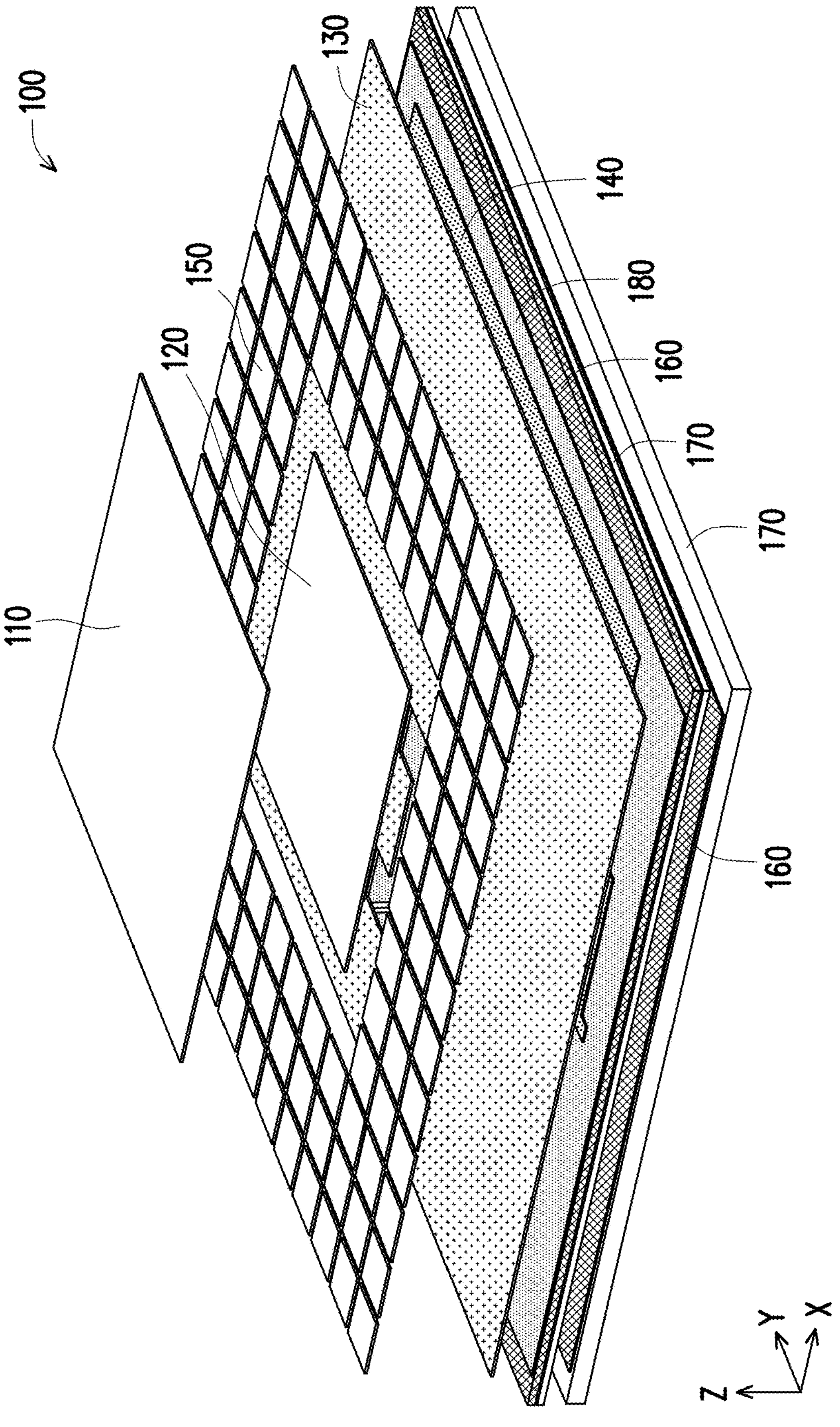
FIG. 1 is a three-dimensional schematic view of an antenna assembly according to an embodiment of the present disclosure.
Figure 2:
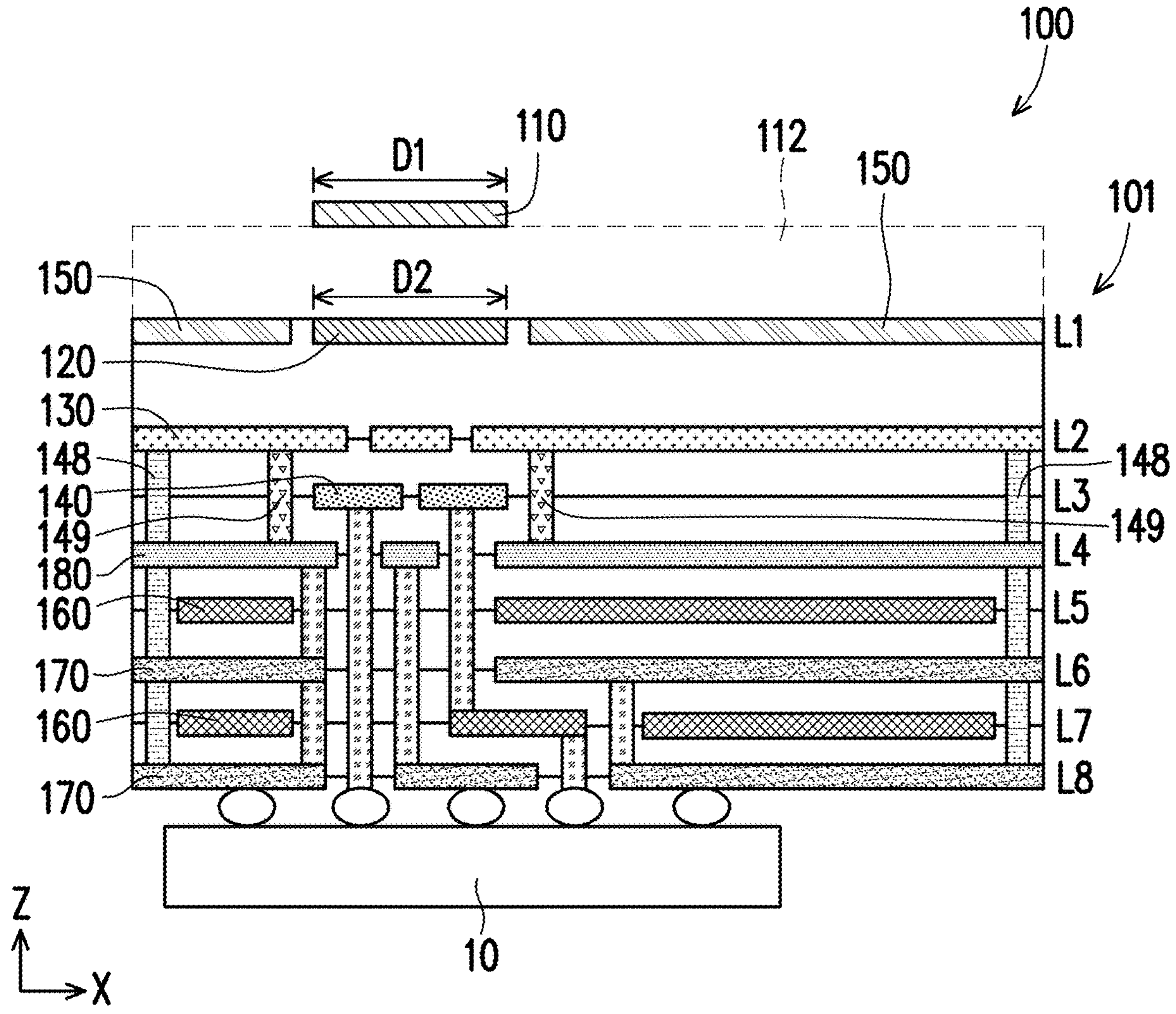
FIG. 2 is a cross-sectional side view of the antenna assembly of FIG. 1.

FIG. 1 is a three-dimensional schematic view of an antenna assembly according to an embodiment of the present disclosure. FIG. 2 is a cross-sectional side view of the antenna assembly of FIG. 1. It should be noted that in order to more clearly illustrate the layers of a circuit board module 101 of an antenna assembly 100, a plastic bracket 112 and a dielectric layer of the circuit board module 101 are not shown in FIG. 1. In addition, FIG. 2 only schematically illustrates the relative positions between the upper and lower layers of the circuit board module 101 of the antenna assembly 100 and the connection relationships between the layers.

Referring to FIG. 1 and FIG. 2, the antenna assembly 100 includes a first patch antenna 110, a second patch antenna 120, a metal layer 130 and a feed-in signal layer 140. The second patch antenna 120 is disposed below the first patch antenna 110. The metal layer 130 is disposed below the second patch antenna 120. The feed-in signal layer 140 is disposed below the metal layer 130. In this embodiment, the antenna assembly 100 has a transmission frequency of 14 GHz to 14.5 GHz and a reception frequency of 10.7 GHz to 12.7 GHz, and may be applied to 1024 phased array antennas for low-orbit satellites.

In this embodiment, the first patch antenna 110 is printed on the plastic bracket 112 with the dimensions of 12.3 mm×12.3 mm×2.5 mm through a Laser Direct Structuring (LDS) process and is then fixed above the circuit board module 101 through the plastic bracket 112. In other embodiments, the first patch antenna 110 may also be printed on a circuit board with a thickness of 0.4 mm and then fixed above the circuit board module 101 through the circuit board.

Further refer to FIG. 2, the circuit board module 101 has layers L1 to L8. The layer L1 includes the second patch antenna 120 and the metal loop structure 150, the layer L2 is the metal layer 130, and the layer L3 is the feed-in signal layer 140. The layer L4 is the second ground layer 180 disposed below the feed-in signal layer 140. The layers L6 and L8 are the first ground layer 170 disposed below the feed-in signal layer 140. The layers L5 and L7 are the wiring layer 160 disposed below the feed-in signal layer 140. The circuit board module 101 is disposed above a chip 10 and is electrically connected to the chip 10. In this embodiment, the dimensions of the circuit board module 101 is 12.3 mm×12.3 mm×3 mm, but is not limited thereto.

It is worth mentioning that the antenna assembly 100 may avoid assembly deviations between the second patch antenna 120 and the circuit board module 101 by designing the second patch antenna 120 as part of the circuit board module 101, and thus avoiding dielectric loss of high-frequency signals caused by adhesives.

In addition, in this embodiment, the dimension D1 of the first patch antenna 110 is 4.5 mm (between 4 and 5 mm), and the dimension D2 of the second patch antenna 120 is 5.8 mm (between 5.3 and 6.3 mm). However, the dimension D1 of the first patch antenna 110, the dimension D2 of the second patch antenna 120, and the dimension relationship between the two are not limited thereto. In other embodiments, the dimension D1 of the first patch antenna 110 may also be smaller than the dimension D2 of the second patch antenna 120. The antenna assembly 100 may adjust the operational frequency range of the antenna assembly 100 by adjusting the dimension and dimension relationship between the first patch antenna 110 and the second patch antenna 120.

Figure 16:
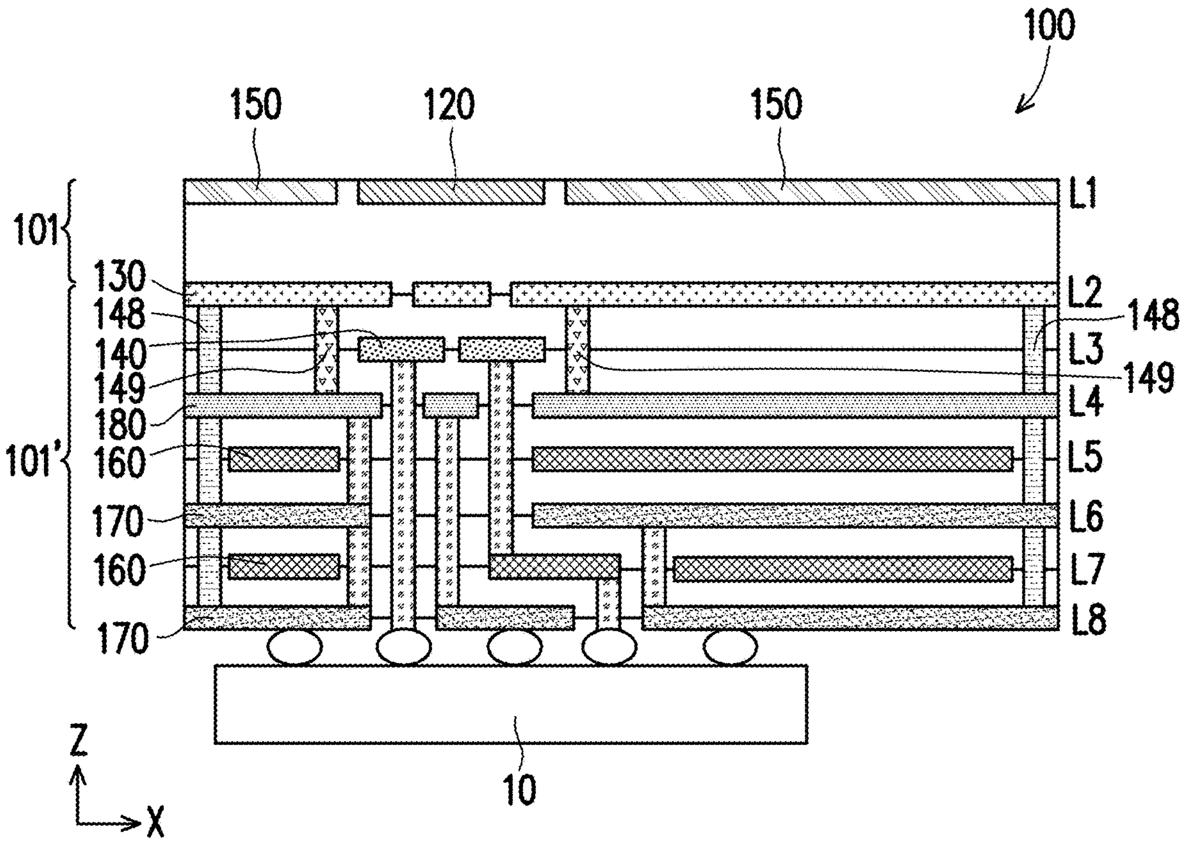
FIG. 16 is a cross-sectional side view of an antenna assembly according to another embodiment of the present disclosure.

In some embodiments of the present disclosure, small modifications of the antenna assembly of the present disclosure would be made. For example, the first patch antenna might be neglected. For another example, the antenna assembly of the present disclosure is composed of two circuit board modules. Please refer to FIG. 16, FIG. 16 is a cross-sectional side view of an antenna assembly of the present disclosure according to another embodiment of the present disclosure. It should be noted that the differences between FIG. 2 and FIG. 16 lie in that (a) the first patch antenna 110 is neglected in FIG. 16; and (b) the antenna assembly in FIG. 16 is composed of two circuit board modules 101 and 101'. In this embodiment, the circuit board module 101 includes merely the layer L1 and the circuit board module 101' includes the layers L2-L8.

Figure 3:
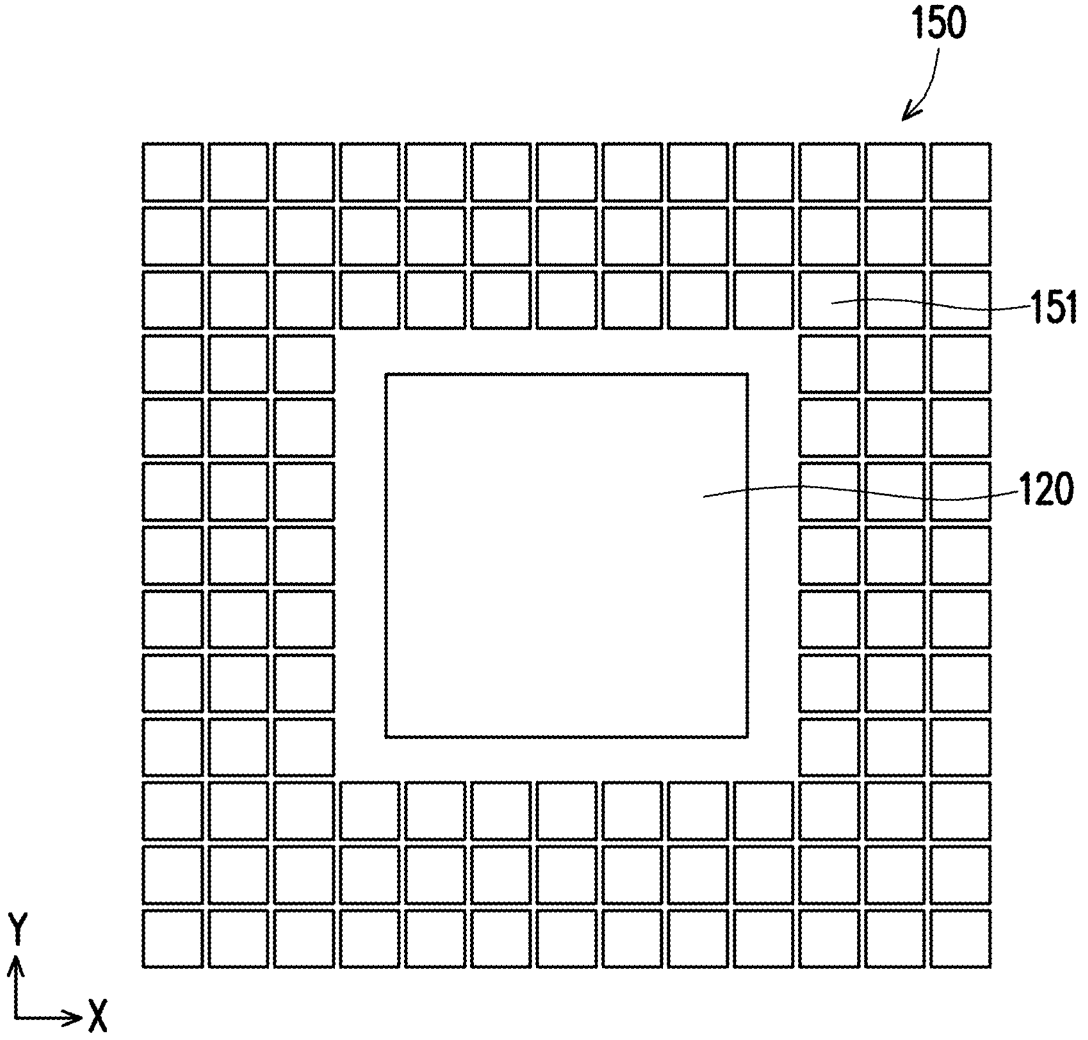
FIG. 3 is a schematic top view of a layer L1 of a circuit board module of FIG. 2.

FIG. 3 is a schematic top view of the layer L1 of the circuit board module of FIG. 2. Referring to FIG. 3, the second patch antenna 120 is surrounded by a metal loop structure 150. The metal loop structure 150 and the second patch antenna 120 are located on the same plane and separated from each other. The metal loop structure 150 includes a plurality of metal units 151 arranged at equal intervals. Such design facilitates a high-impedance surface structure around the second patch antenna 120. In this embodiment, the metal loop structure 150 is composed of 13×13 metal units 151. The dimensions of the metal unit 151 are 0.925 mm×0.925 mm, and the distances amongst one and another metal unit 151 are 0.1 mm.

It is worth mentioning that the antenna assembly 100 is designed in a manner in which the second patch antenna 120 is surrounded by the metal loop structure 150, so that the S21 parameter between the two antenna assemblies 100 is improved. In this embodiment, the S21 parameter between the two antenna assemblies 100 may be improved by 2 dB to 3 dB.

Figure 4A:
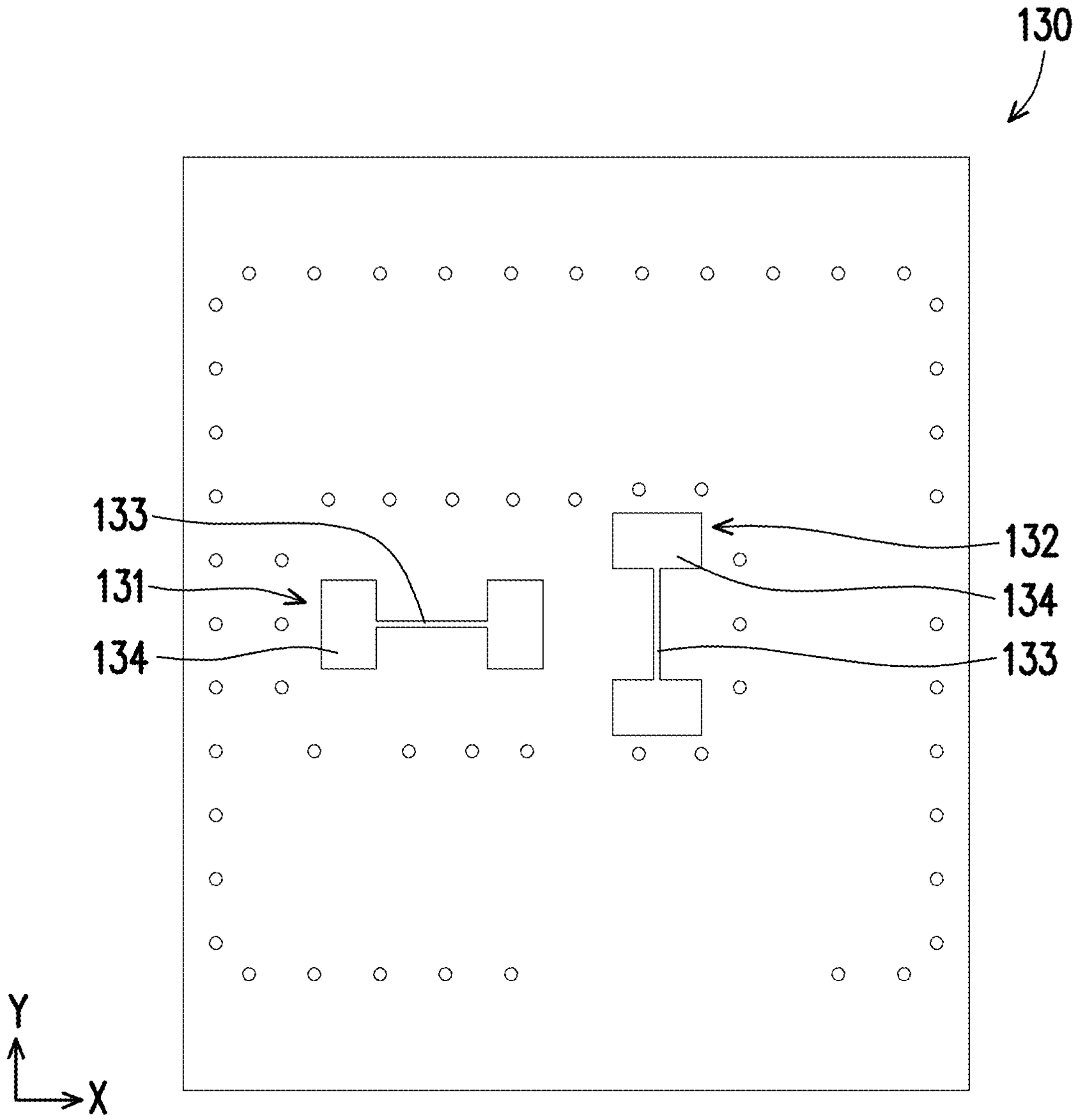
FIG. 4A is a schematic top view of a layer L2 of the circuit board module of FIG. 2.

FIG. 4A is a schematic top view of the layer L2 of the circuit board module of FIG. 2. Referring to FIG. 4A, the metal layer 130 includes a first slot 131 and a second slot 132. The main extension direction of the first slot 131 is orthogonal to the main extension direction of the second slot 132. Such design allows the antenna assembly 100 to have circular polarization characteristics through the first slot 131 and the second slot 132. In this embodiment, the main extension direction of the first slot 131 is the X-axis direction, and the main extension direction of the second slot 132 is the Y-axis direction.

In addition, each of the first slot 131 and the second slot 132 includes a slit 133 and two symmetrical holes 134 disposed at both ends of the slit 133. The width of each of the two holes 134 is greater than the width of the slit 133. Such design improves the transmission and reception functions of the antenna assembly 100.

In this embodiment, the shape of each hole 134 is a rectangle, but the shape of each hole 134 may also be a polygon, a circle or an ellipse.

Figure 4B:
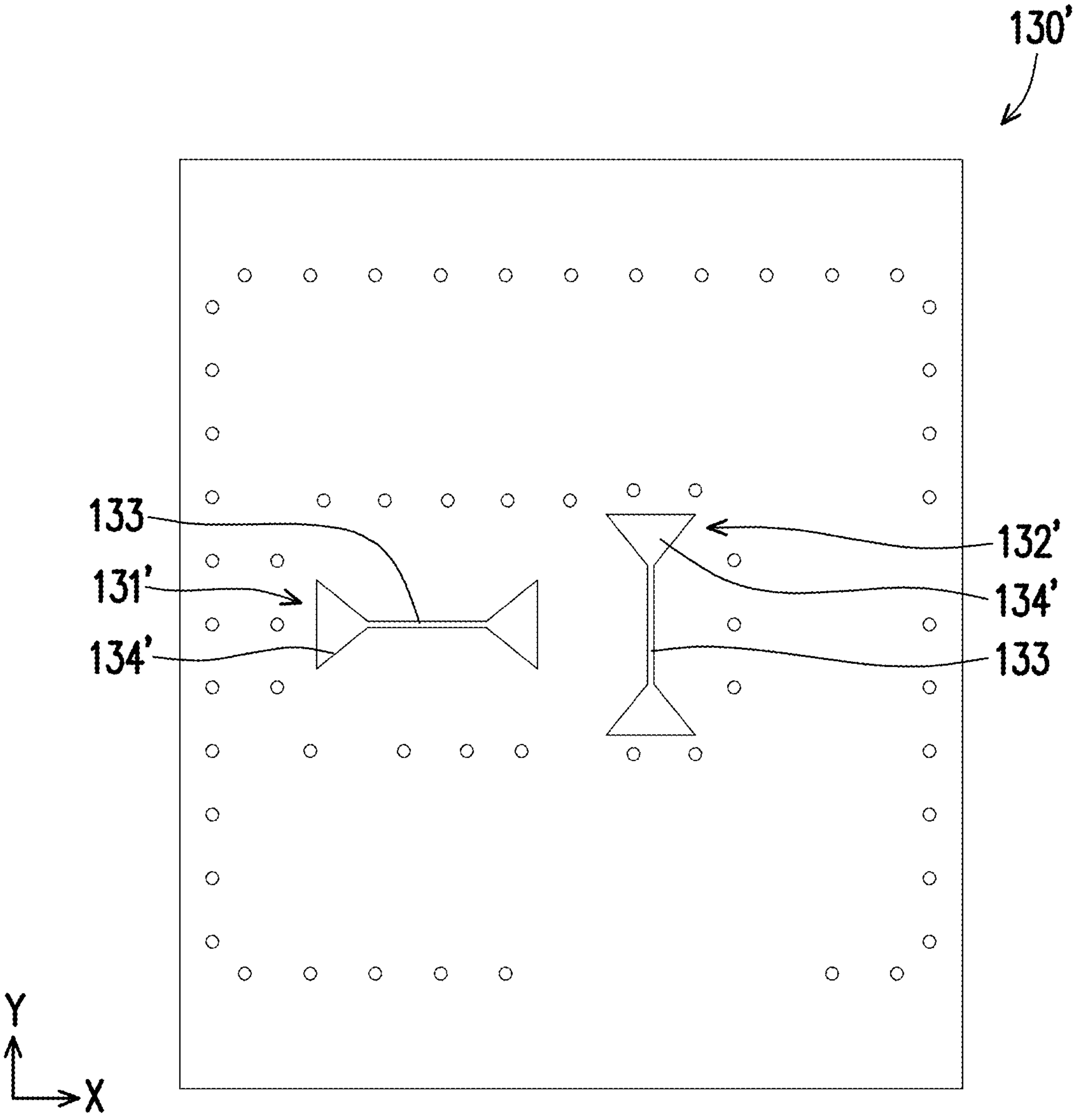
FIG. 4B is a schematic top view of the layer L2 of the circuit board module according to another embodiment of the present disclosure.
Figure 4C:
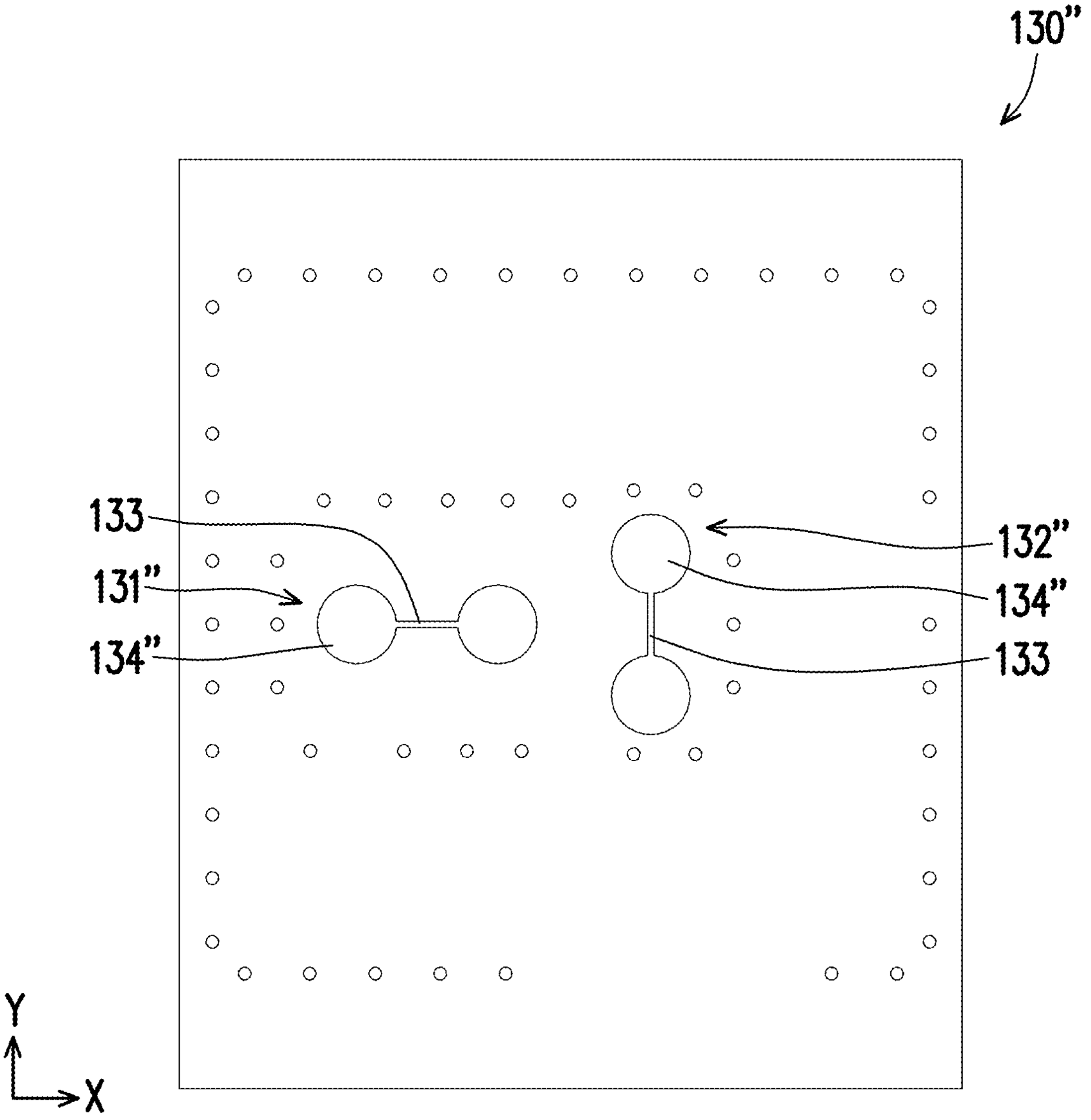
FIG. 4C is a schematic top view of the layer L2 of the circuit board module according to yet another embodiment of the present disclosure.

FIG. 4B is a schematic top view of the layer L2 of the circuit board module according to another embodiment of the present disclosure. FIG. 4C is a schematic top view of the layer L2 of the circuit board module according to yet another embodiment of the present disclosure. It should be noted that the differences amongst FIG. 4A, FIG. 4B and FIG. 4C lie in the shapes of the holes 134, 134', 134" of the first slot 131, 131', 131" and the second slot 132, 132', 132". Please refer to FIG. 4B and FIG. 4C, the shapes of the holes 134' of the first slot 131' and the second slot 132' of the metal layer 130' are triangles, and the shapes of the holes 134" of the first slot 131" and the second slot 132" of the metal layer 130" are circular.

Figure 5:
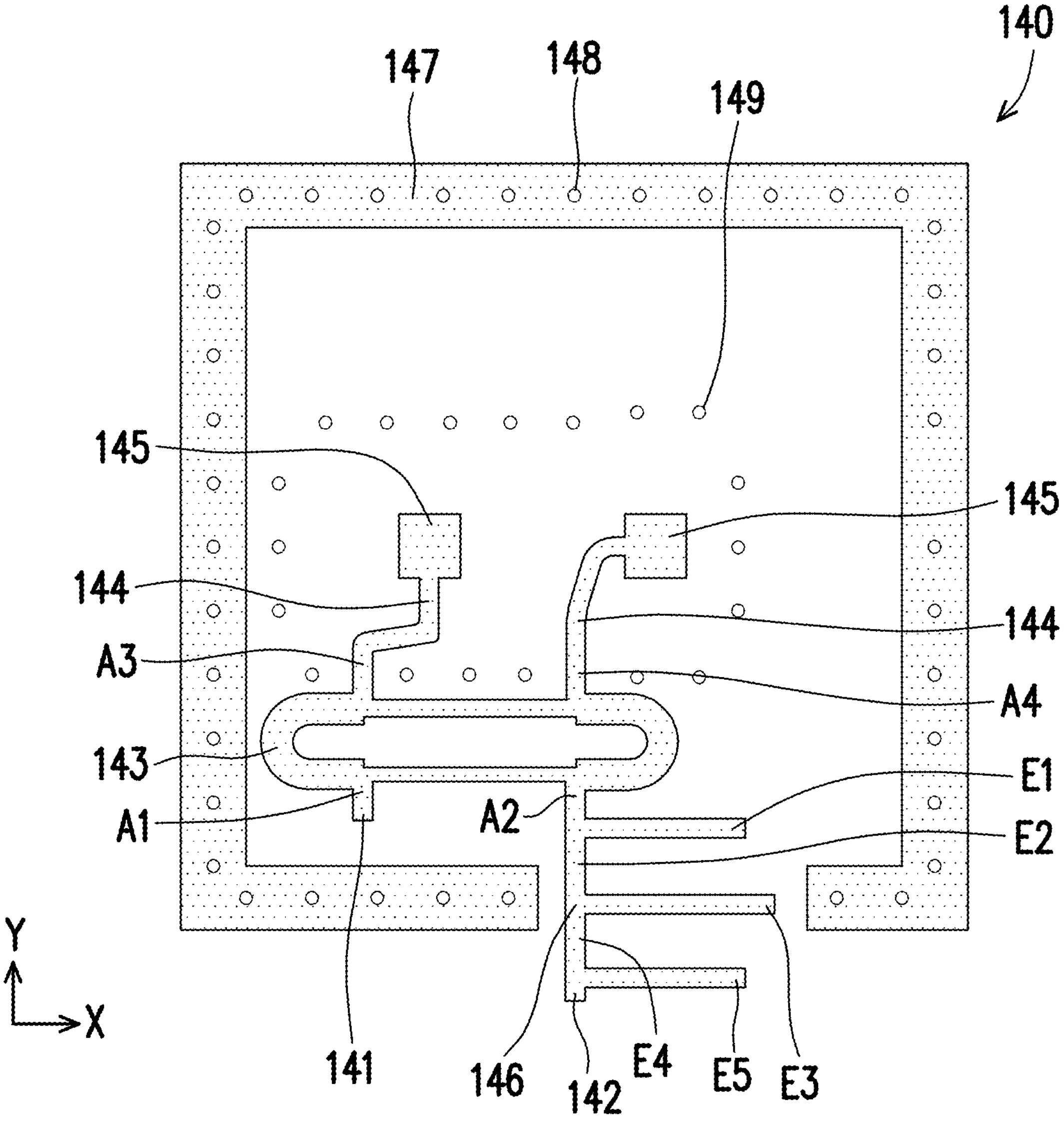
FIG. 5 is a schematic top view of a layer L3 of the circuit board module of FIG. 2 or FIG. 16.

FIG. 5 is a schematic top view of the layer L3 of the circuit board module of FIG. 2 or FIG. 16. Please refer to FIG. 5, the feed-in signal layer 140 includes a transmitting port 141, a receiving port 142, a hybrid coupler 143 and two microstrips 144. Ports A1 to A4 of the hybrid coupler 143 are connected to the transmitting port 141, the receiving port 142 and the two microstrips 144 respectively.

The antenna assembly 100 is provided with the hybrid coupler 143 so that the feed-in signals of the port A1 and the port A2 have a phase difference of 90 degrees, and the transmitting port 141 and the receiving port 142 have circular polarization characteristics. In this embodiment, the transmitting port 141 has left-hand circular polarization (LHCP) characteristics, and the receiving port 142 has right-hand circular polarization (RHCP) characteristics.

In addition, in this embodiment, transmission lines of the ports A1 to A4 have line widths of 0.292 mm and resistance of 50 ohms. Paths from the port A1 to the port A2 and the port A3 to the port A4 have line widths of 0.292 mm, lengths of 3.11 mm, and resistance of 50 ohms. The U-shaped paths from the port A1 to the port A3 and the port A2 to the port A4 have line widths of 0.521 mm, lengths of 3.11 mm, and resistance of 35 ohms.

Please further refer to FIG. 5. Two microstrips 144 extend from the port A3 and the port A4 of the hybrid coupler 143 in a direction away from the hybrid coupler 143. In this embodiment, the two ends 145 of the two microstrips 144 are rectangular and have the dimensions of 1 mm×1 mm, but the shapes of the two ends 145 are not limited thereto. In other embodiments, the shapes of the two ends 145 may be adapted to the first slots 131, 131', 131" and the second slots 132, 132', 132" of the metal layer 130, 130', 130" as shown in FIG. 4A, FIG. 4B or FIG. 4C.

The feed-in signal layer 140 further includes a ground conductive via zone 147 and first conductive vias 148. The ground conductive via zone 147 surrounds the transmitting port 141, the hybrid coupler 143 and the two microstrips 144. The receiving port 142 extends beyond the ground conductive via zone 147. In addition, the first conductive vias 148 are located in the ground conductive via zone 147 to connect the feed-in signal layer 140 with the metal layer 130 and the first ground layer 170 as shown in FIG. 2. Such design may further improve the S21 parameter between the antenna assemblies 100.

Please refer to FIG. 2 and FIG. 5 together. The antenna assembly 100 further includes second conductive vias 149. As shown in FIG. 5, these second conductive vias 149 surround the two microstrips 144 and connect the feed-in signal layer 140 with the metal layer 130 and the second ground layer 180 as shown in FIG. 2. In different embodiments, these second conductive vias 149 may be disposed at different positions to affect the resonant frequency and improve the S parameters.

The feed-in signal layer 140 may further include a filter 146, which is connected between the receiving port 142 and the port A2 of the hybrid coupler 143 to filter out the transmission signal of the transmitting port 141 and prevent the transmission signal of the transmitting port 141 from leaking into the receiving port 142 through the hybrid coupler 143 and affecting the signal received at the receiving port 142. In this embodiment, the filter 146 is an E-shaped low-pass filter (LPF) with equal widths. The path lengths from a position E1 to a position E2 and from a position E4 to a position E5 are 2.54 mm, the path length from a position E3 to a position E4 is 3.05 mm, and the path length from the position E2 to the position E4 is 0.889 mm.

It should be noted that the type of the filter 146 is not limited to the E-shaped low-pass filter with equal widths. In other embodiments, depending on different transmission frequency intervals, the type of the filter 146 may be modified correspondingly.

Figure 17:
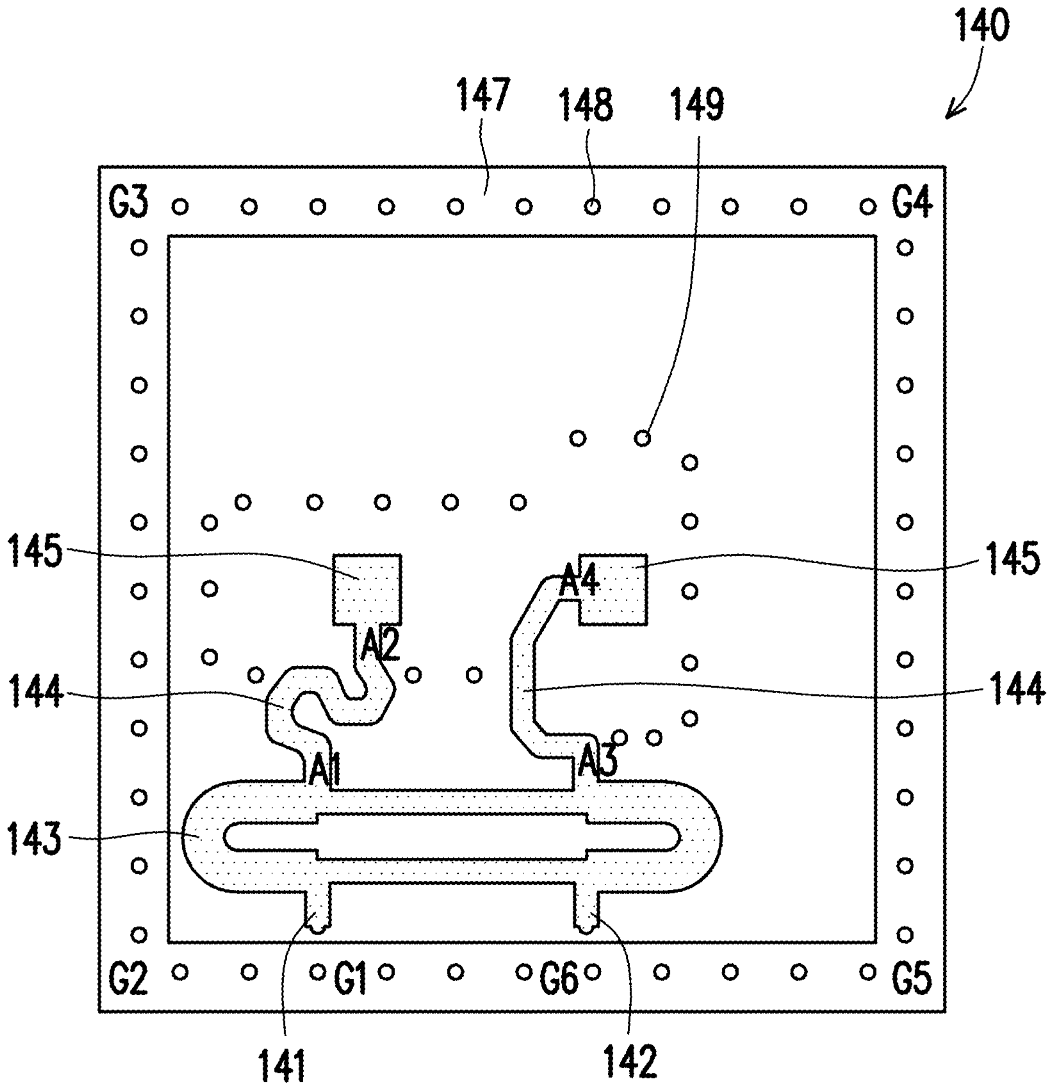
FIG. 17 is a schematic top view of the layer L3 of the circuit board module of FIG. 2 or FIG. 16 according to another embodiment of the present disclosure.

In some embodiments of the present disclosure, modifications would be made on the layer L3. FIG. 17 is a schematic top view of the layer L3 of the circuit board module of FIG. 2 or FIG. 16 according to another embodiment of the present disclosure. Please refer to FIG. 17, the differences between FIG. 5 and FIG. 17 lie in that the filter 146 is neglected in FIG. 17, and the ground conductive via zone 147 encompasses the transmitting port 141, the receiving port 142, the hybrid coupler 143 and the two microstrips 144.

Figure 6:
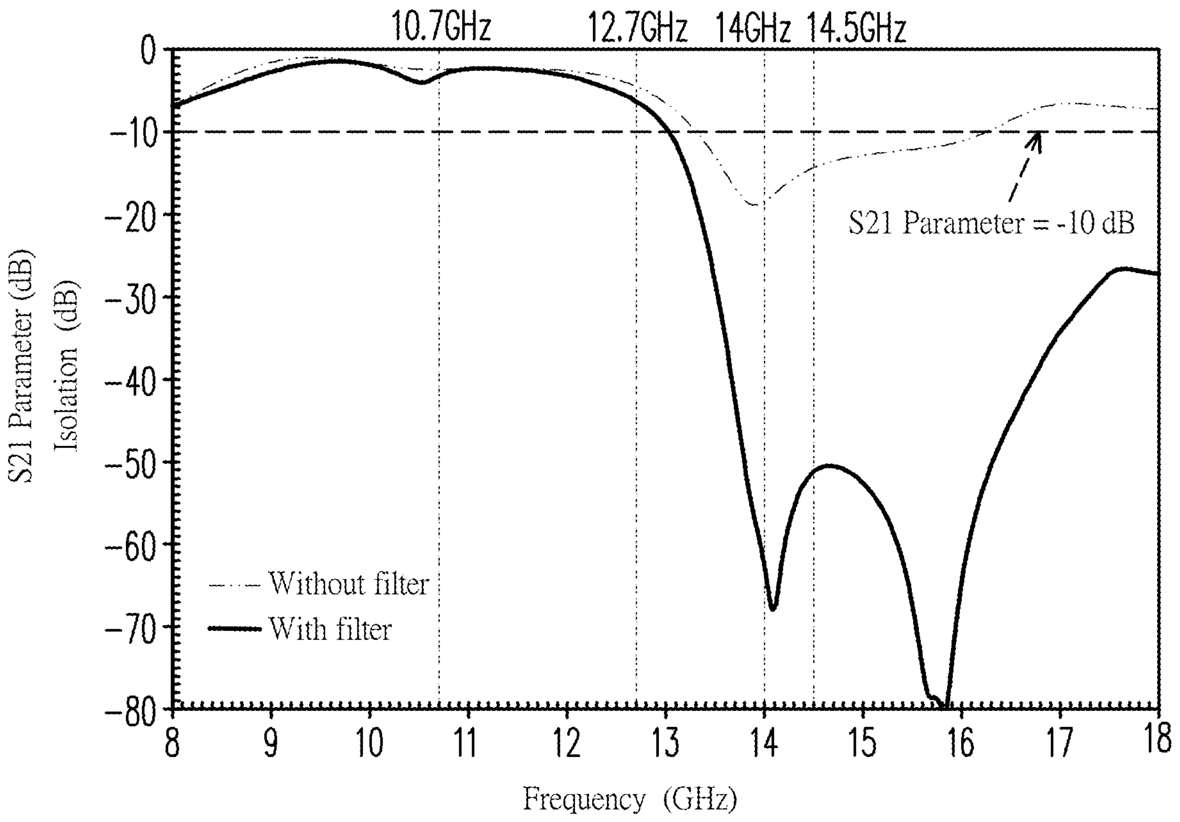
FIG. 6 is a plot diagram of frequency vs. S21 parameter at the receiving port of the antenna assembly in FIG. 1.

FIG. 6 is a plot diagram of frequency vs. S21 parameter at the receiving port of the antenna assembly in FIG. 1. Please refer to FIG. 6, the S21 parameter of the receiving port 142 within 14 GHz to 14.5 GHz is less than −50 dB. In other words, the filter 146 may effectively isolate the transmission signal leaking from the transmitting port 141, and the filter 146 may increase the S21 parameter by at least 30 dB.

Figure 7:
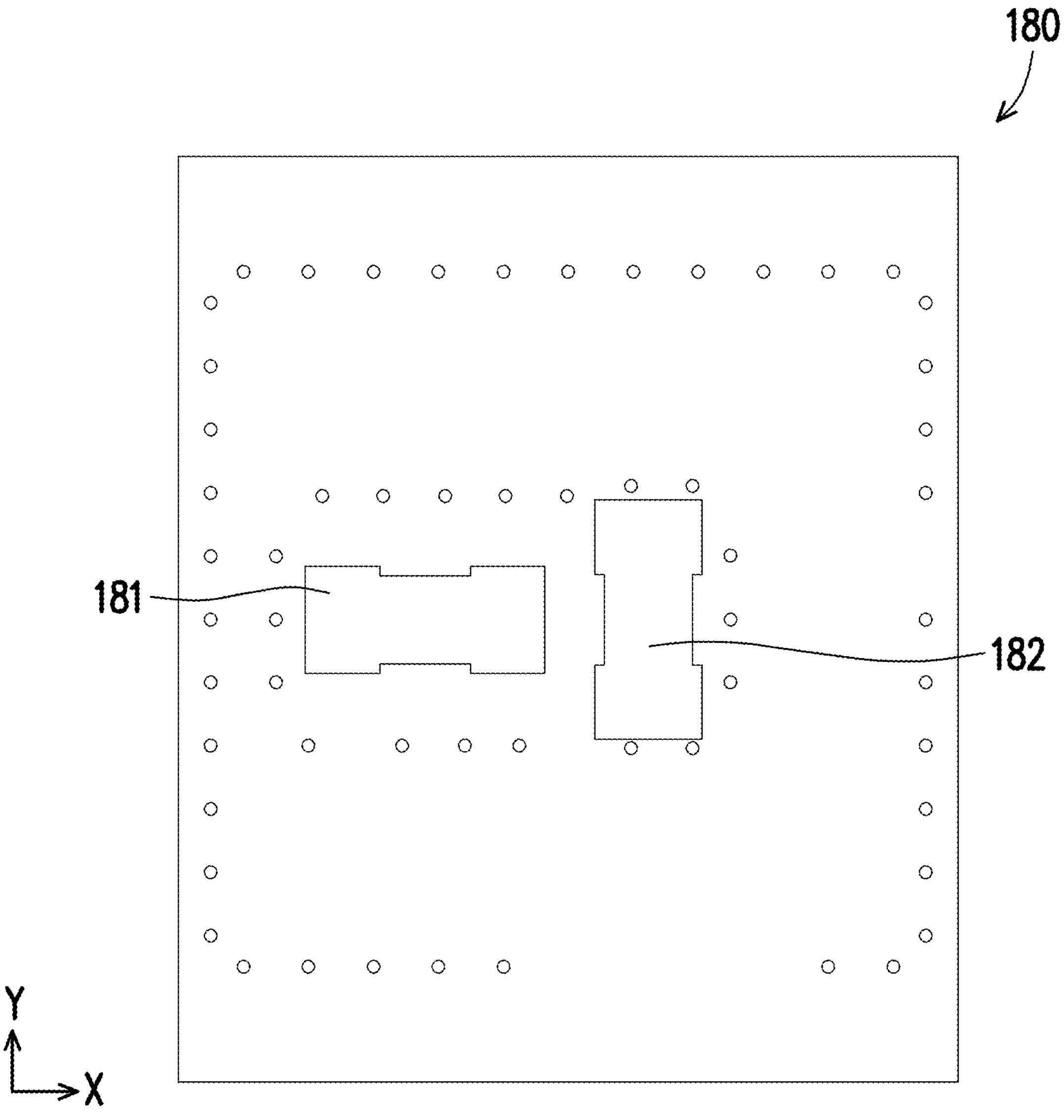
FIG. 7 is a schematic top view of a layer L4 of the circuit board module of FIG. 2.

FIG. 7 is a schematic top view of the layer L4 of the circuit board module of FIG. 2. Referring to FIG. 7, a second ground layer 180 includes a first opening 181 and a second opening 182. The first opening 181 and the second opening 182 correspond to the first slot 131 and the second slot 132, respectively, as shown in FIG. 4A. That is to say, the first opening 181 and the second opening 182 are located right below the first slot 131 and the second slot 132. Such design may avoid the capacitive effect generated by the antenna assembly 100.

Figure 8:
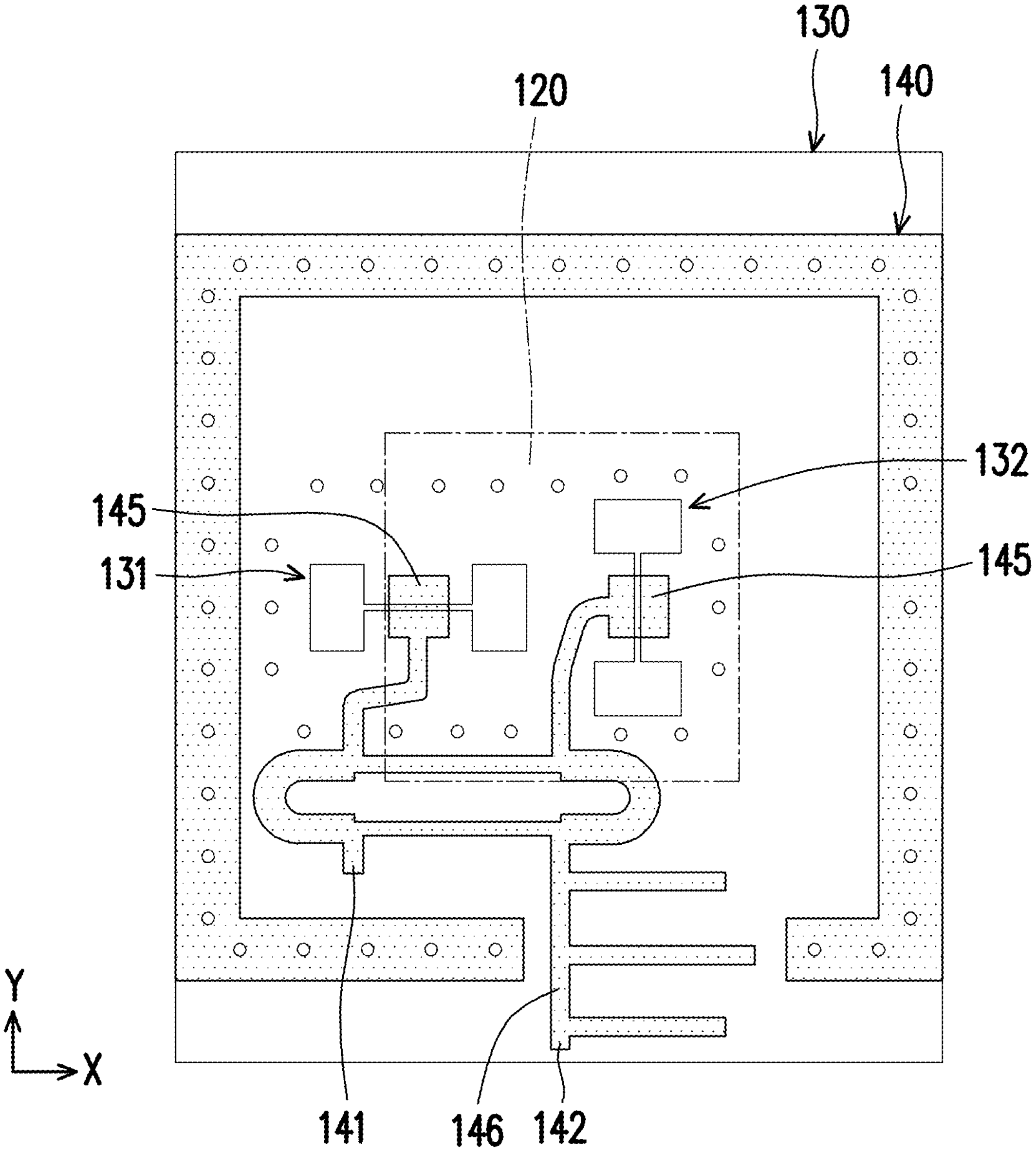
FIG. 8 is a top perspective view of the layers L1 to L3 of the circuit board module of FIG. 2.

FIG. 8 is a top perspective view of the layers L1 to L3 of the circuit board module of FIG. 2. In order to more clearly show the relative relationship between the metal layer 130 (layer L2) and the feed-in signal layer 140 (layer L3), the metal loop structure 150 of the layer L1 is not shown in FIG. 8.

Please refer to FIG. 8, the projections of the two ends 145 of the two microstrips 144 onto the metal layer 130 overlap with the first slot 131 and the second slot 132. In this embodiment, the distance between the central points of the two ends 145 is 3.6 mm. In addition, the two ends 145 are disposed right below the central point of the slit 133 of the first slot 131 and the central point of the slit 133 of the second slot 132. The coupling occurs between two ends 145 and the first slot 131 and the second slot 132. Such design allows the transmitting port 141 and the receiving port 142 to have dual-feed broadband circular polarization characteristics.

Therefore, in this embodiment, when the antenna assembly 100 transmits a signal, the signal is transmitted from the chip 10 (see FIG. 2) to the transmitting port 141 as shown in FIG. 5. Please further refer to FIG. 5, the signal generates left-hand polarization and right-hand polarization feed-in signals through the hybrid coupler 143. After the signal is transmitted to the two ends 145 via the two microstrips 144, the signal is coupled to the second patch antenna 120 (see FIG. 2) through the first slot 131 and the second slot 132 of the metal layer 130 as shown in FIG. 4A, and then transmitted to the first patch antenna 110 (see FIG. 2). Lastly, the antenna assembly 100 transmits the signal.

The other way around, when the antenna assembly 100 receives a signal, the signal received from the first patch antenna 110 (see FIG. 2) is passed to the second patch antenna 120 (see FIG. 2), and is coupled to the two ends 145 of the feed-in signal layer 140 through the first slot 131 and the second slot 131 of the metal layer 130 as shown in FIG. 4A. As shown in FIG. 5, the signal then reaches the receiving port 142 via the two microstrips 144, the hybrid coupler 143 and the filter 146, and lastly the received signal is sent to the chip 10 (see FIG. 2).

The above design allows the antenna assembly 100 to perform both transmission and reception functions, and the antenna signal has circular polarization characteristics, so the antenna assembly 100 has good performance.

In addition, it should be noted that, as shown in FIG. 8, in this embodiment, when the main extension direction of the first slot 131 is the X-axis direction, and the main extension direction of the second slot 132 is the Y-axis direction, and the transmitting port 141 is disposed on the left sides of the receiving port 142 and the filter 146, the feed-in type of such design is defined as 0.

Figure 9:
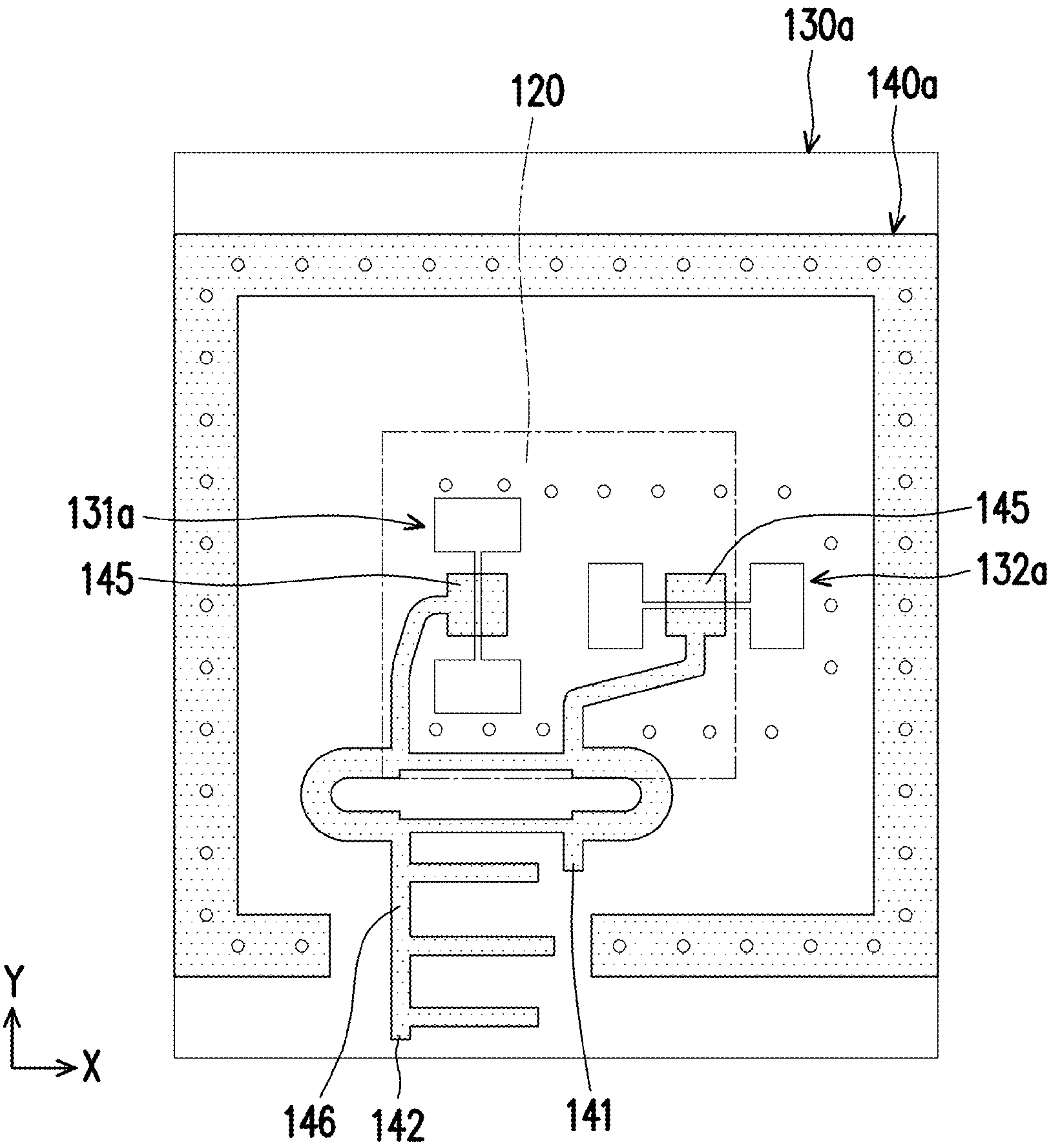
FIG. 9 is a top perspective view of the layers L1 to L3 of the circuit board module of the antenna assembly according to another embodiment of the present disclosure.

FIG. 9 is a top perspective view of the layers L1 to L3 of the circuit board module of the antenna assembly according to another embodiment of the present disclosure. The difference between FIG. 9 and FIG. 8 mainly lies in the main extension directions of the first slot 131*a* and the second slot 132*a*, and the positions of the transmitting port 141, the receiving port 142 and the filter 146. Referring to FIG. 9, the main extending direction of the first slot 131*a* is the Y-axis direction, the main extending direction of the second slot 132*a* is the X-axis direction, and the transmitting port 141 is disposed on the right sides of the receiving port 142 and the filter 146. In this embodiment, the feed-in type of such design is defined as 1.

Figure 10A:
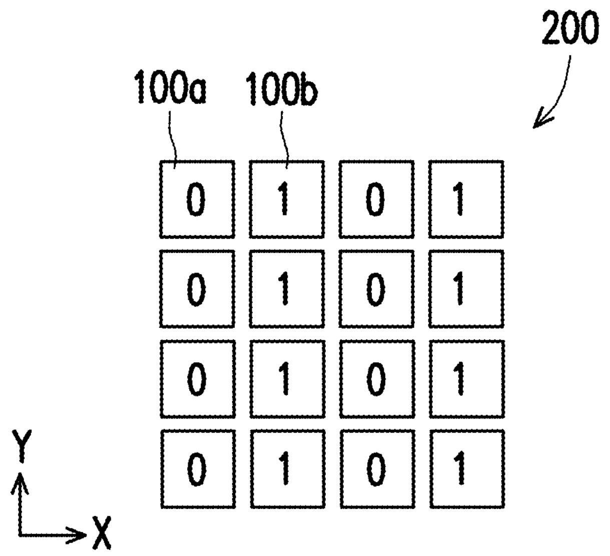
FIG. 10A is a schematic view of a 4×4 antenna array according to an embodiment of the present disclosure.
Figure 10B:
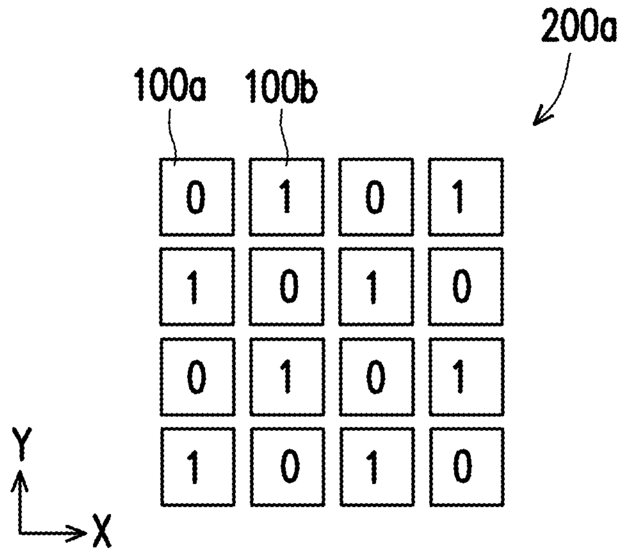
FIG. 10B is a schematic view of a 4×4 antenna array according to another embodiment of the present disclosure.

FIG. 10A is a schematic view of a 4×4 antenna array according to an embodiment of the present disclosure. FIG. 10B is a schematic view of a 4×4 antenna array according to another embodiment of the present disclosure. Referring to FIG. 10A and FIG. 10B, antenna arrays 200 and 200*a* include a plurality of first antenna assemblies 100*a* and a plurality of second antenna assemblies 100*b*, and the first antenna assemblies 100*a* and the second antenna assemblies 100*b* are arranged in an array. In this embodiment, the first antenna assembly 100*a* is, for example, the antenna assembly 100 in FIG. 1, and the feed-in type thereof is 0. The difference between the second antenna assembly 100*b* and the first antenna assembly 100*a* is that the layer L1 to layer L3 of the second antenna assembly 100*b* is of the type shown in FIG. 9, and the feed-in type thereof is 1.

Referring to the layer L1 to layer L3 whose feed-in type is 0 as shown in FIG. 8 and the layer L1 to layer L3 whose feed-in type is 1 as shown in FIG. 9, the main extension direction of the first slot 131 of each first antenna assembly 100*a* is orthogonal to the main extension direction of the first slot 131*a* of each second antenna assembly 100*b*, and the relative position of the transmitting port 141 and the receiving port 142 of each first antenna assembly 100*a* is opposite the relative position of the transmitting port 141 and the receiving port 142 of each second antenna assembly 100*b*.

According to the arrangement positions of the first antenna assemblies 100*a* and the second antenna assemblies 100*b*, an antenna array 200 may be formed as shown in FIG. 10A, in which the first antenna assemblies 100*a* are located in the odd-numbered columns, and the second antenna assemblies 100*b* are located in the even-numbered columns. In addition, the first antenna assemblies 100*a* and the second antenna assemblies 100*b* may also form an antenna array 200*a* as shown in FIG. 10B, in which the first antenna assemblies 100*a* and the second antenna assemblies 100*b* are arranged alternately in columns and rows.

Figure 11:
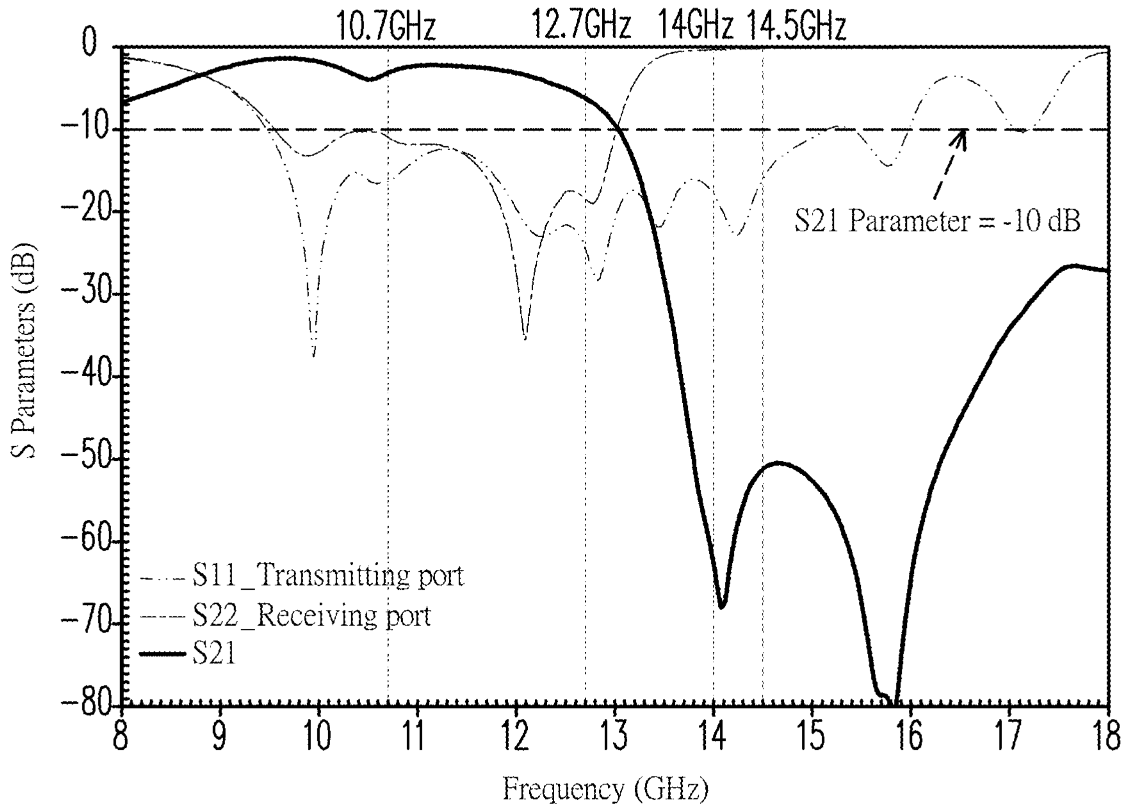
FIG. 11 is a plot diagram of frequency vs. S parameters for the antenna array of FIG. 10A.

FIG. 11 is a plot diagram of frequency vs. S parameters for the antenna array of FIG. 10A. Please refer to FIG. 11, the S21 parameter of the antenna array 200 in FIG. 10A is lower than −50 dB within the frequencies 14 GHz to 14.5 GHz, which means that the filter 146 may effectively isolate the transmission signal leaking from the hybrid coupler 143 to the receiving port 142.

Figure 12:
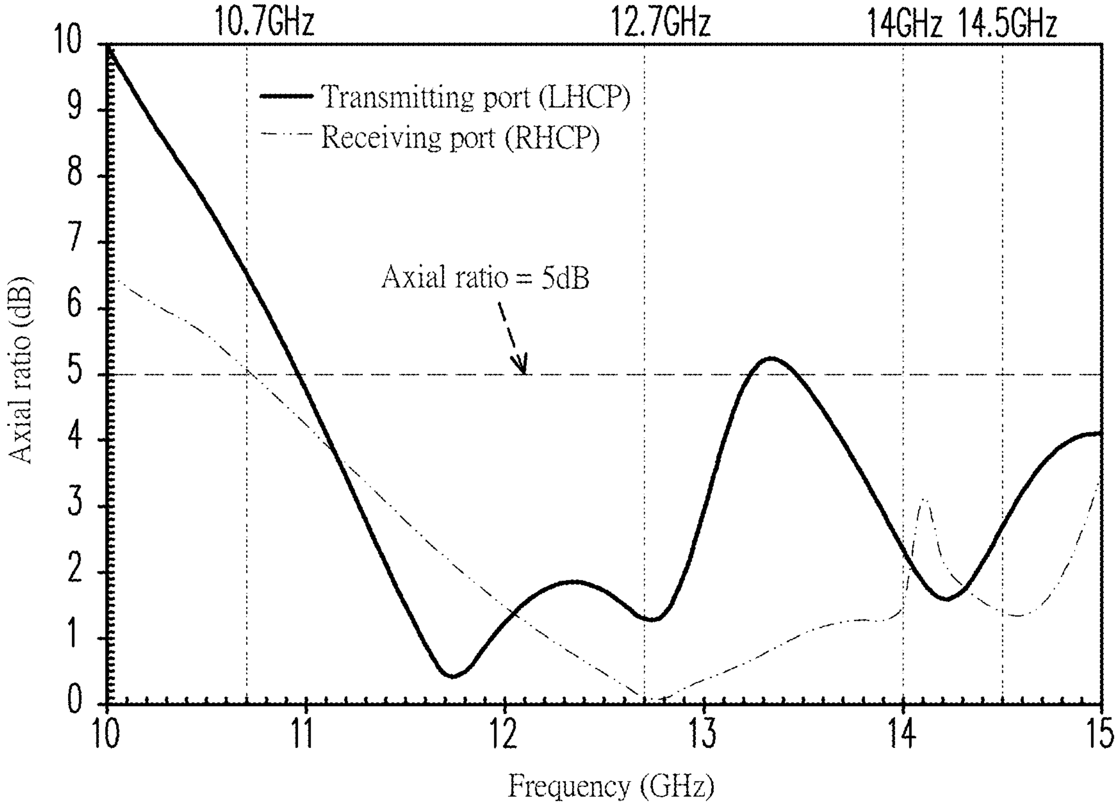
FIG. 12 is a plot diagram of frequency vs. axial ratio for the antenna array of FIG. 10A.

FIG. 12 is a plot diagram of frequency vs. axial ratio for the antenna array of FIG. 10A. Please refer to FIG. 12, the axial ratio of the transmitting port 141 within the frequency range of 14 GHz to 14.5 GHz and the axial ratio of the receiving port 142 within the frequency range of 10.7 GHz to 12.7 GHz for the antenna array 200 in FIG. 10A are less than 5 dB, and therefore a good performance may be achieved.

Figure 13:
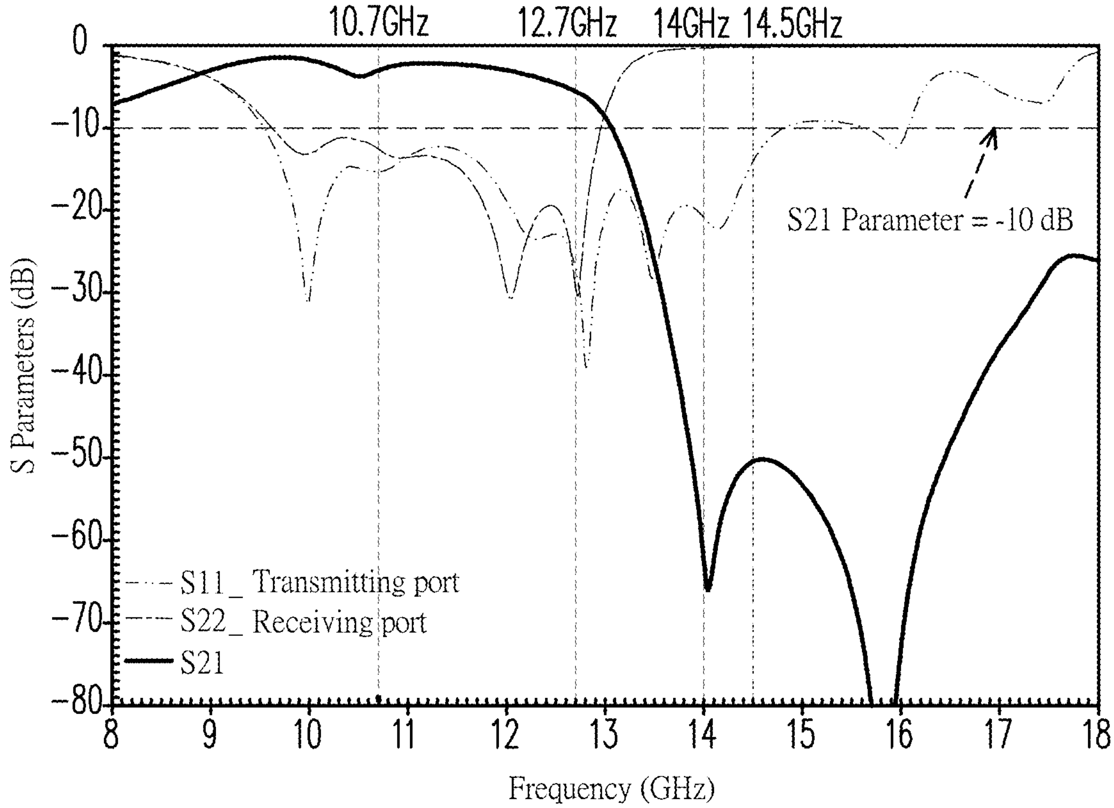
FIG. 13 is a plot diagram of frequency vs. S parameters for the antenna array of FIG. 10B.

FIG. 13 is a plot diagram of frequency vs. S parameters for the antenna array of FIG. 10B. Please refer to FIG. 13, the S21 parameter of the antenna array 200*a* in FIG. 10B is less than −50 dB within the frequencies 14 GHz to 14.5 GHz, which means that the filter 146 may effectively isolate the transmission signal leaking from the hybrid coupler 143 to the receiving port 142.

Figure 14:
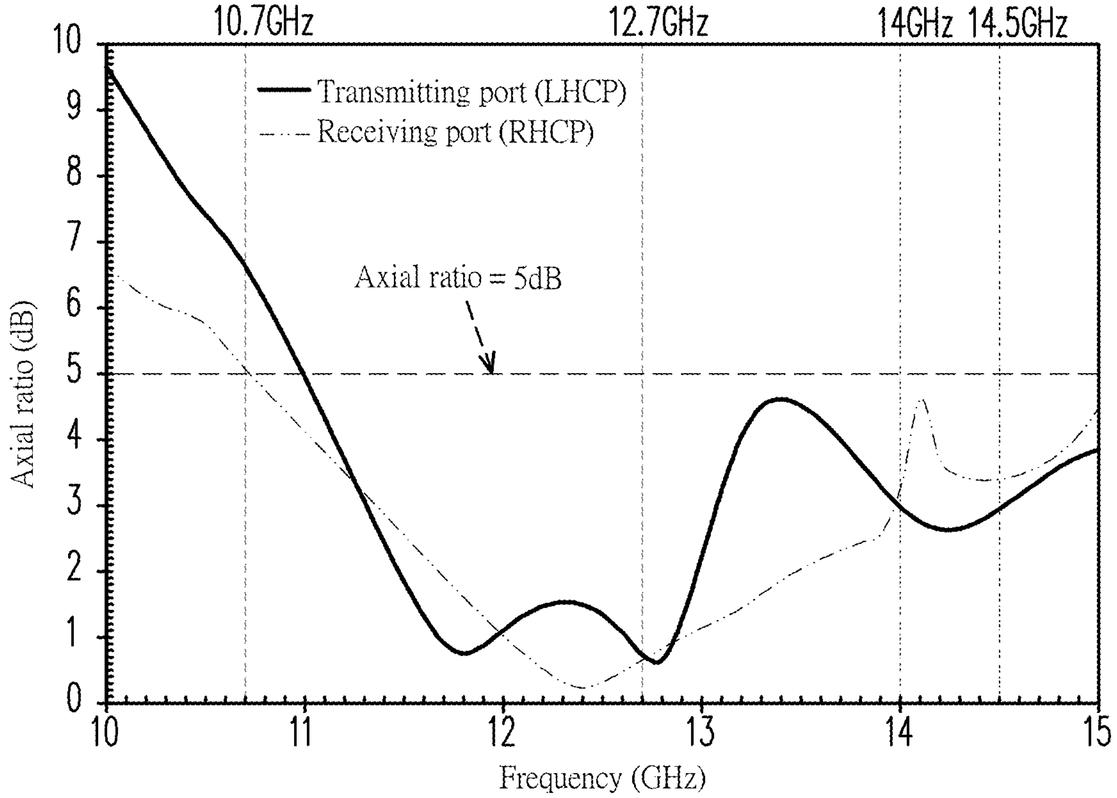
FIG. 14 is a plot diagram of frequency vs. axial ratio for the antenna array of FIG. 10B.

FIG. 14 is a plot diagram of frequency vs. axial ratio for the antenna array of FIG. 10B. Please refer to FIG. 14, the axial ratio of the transmitting port 141 within the frequency range of 14 GHz to 14.5 GHz and the axial ratio of the receiving port 142 within the frequency range of 10.7 GHz to 12.7 GHz for the antenna array 200*a* in FIG. 10B are less than 5 dB, and therefore a good performance may be achieved.

Figure 15A:
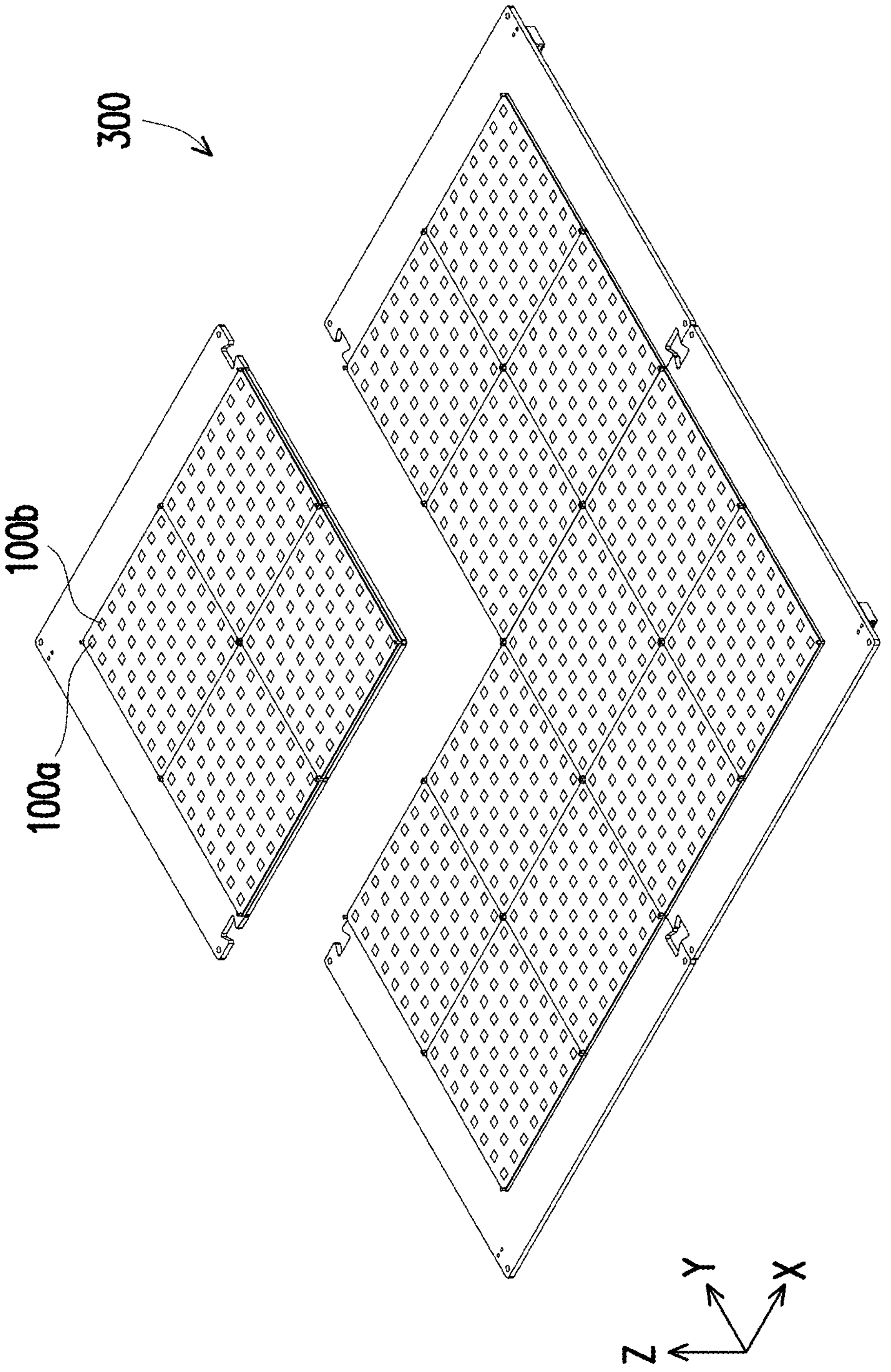
FIG. 15A is an exploded schematic view of a 32×32 antenna array composed of four 16×16 antenna arrays.
Figure 15B:
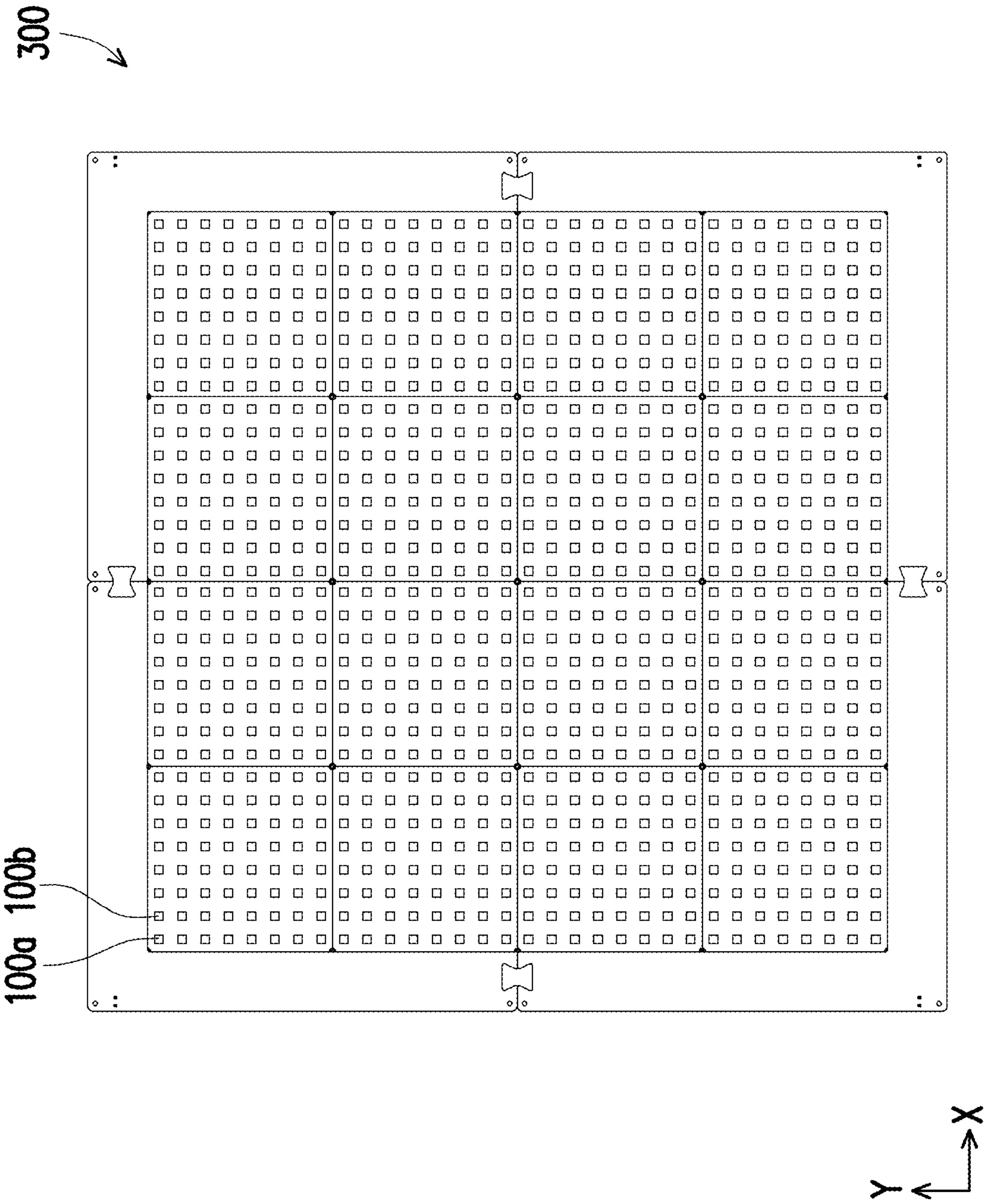
FIG. 15B is a schematic top view of the 32×32 antenna array of FIG. 15A according to an embodiment of the present disclosure.

FIG. 15A is an exploded schematic view of a 32×32 antenna array composed of four 16×16 antenna arrays. FIG. 15B is a schematic top view of the 32×32 antenna array of FIG. 15A. Please refer to FIG. 15A and FIG. 15B, an antenna array 300 is, for example, 1024 phased array antennas. The antenna array 300 is composed of four 16×16 antenna arrays and consists of the above-mentioned first antenna assemblies 100*a* and the second antennas 100*b*, and has a mixed configuration of the antenna array 200 and the antenna array 200*a*. In this embodiment, the number of the antenna array 300 is configured as 32×32, but it is not limited thereto. In addition, in this embodiment, the antenna array 300 rotates the main beam through the plastic bracket 112 filled with the liquid crystal material to beamforming the desired transmission or reception position. In other embodiments, the antenna array 300 may also achieve the same effect through the beamforming chip.

In summary, the antenna assembly of the present disclosure provides a hybrid coupler for the feed-in signal layer, so that the transmitting port and the receiving port have circular polarization characteristics. In addition, the second patch antenna is surrounded by a metal loop structure, and the feed-in signal layer has a ground conductive via zone surrounding the transmitting port, the hybrid coupler and the two microstrips, which may improve the isolation between the two antenna assemblies. On the other hand, the width of each hole of the first slot and the second slot is greater than the width of the slit, which may improve the transmission and reception functions of the antenna assembly. The antenna array of the present disclosure includes the above-mentioned antenna assembly and has good S parameters and axial ratio.

What is claimed is:

1. An antenna assembly, comprising:

a second patch antenna;

a metal layer disposed on a side of the second patch antenna and comprising a first slot and a second slot, a main extension direction of the first slot being orthogonal to a main extension direction of the second slot; and a feed-in signal layer disposed on a side of the metal layer opposite the second patch antenna and comprising a transmitting port, a receiving port, a hybrid coupler and two microstrips, wherein the transmitting port and the receiving port are connected to the hybrid coupler, and the two microstrips extend from the hybrid coupler in a direction away from the hybrid coupler, and projections of two ends of the two microstrips onto the metal layer are overlapped with the first slot and the second slot, wherein the feed-in signal layer further comprises a filter connected between the receiving port and the hybrid coupler.

2. The antenna assembly according to claim 1, further comprises a first patch antenna disposed on another side of the second patch antenna opposite the metal layer.

3. The antenna assembly according to claim 1, wherein each of the first slot and the second slot comprises a slit and two holes with symmetrical shapes disposed at both ends of the slit, a width of each of the two holes is greater than a width of the slit, the shape of each of two holes comprises a polygon, a circle or an ellipse.

4. The antenna assembly according to claim 1, wherein the second patch antenna is surrounded by a metal loop structure, the metal loop structure and the second patch antenna are located on the same plane and separated from each other, the metal loop structure comprises a plurality of metal units arranged at equal intervals.

5. The antenna assembly according to claim 1, wherein the feed-in signal layer further comprises a ground conductive via zone surrounding the transmitting port, the hybrid coupler and the two microstrips.

6. The antenna assembly according to claim 1, further comprising a plurality of first conductive vias and at least one wiring layer and at least one first ground layer located on a side of the feed-in signal layer opposite the metal layer, wherein the plurality of first conductive vias are connected to the metal layer and the at least one first ground layer.

7. The antenna assembly according to claim 6, further comprising a second ground layer, which is disposed between the feed-in signal layer and the at least one first ground layer, and comprises a first opening and a second opening, wherein the first opening and the second opening correspond to the first slot and the second slot respectively.

8. The antenna assembly according to claim 7, further comprising a plurality of second conductive vias surrounding the two microstrips and connected to the metal layer and the second ground layer.

9. An antenna array, comprising:

a plurality of first antenna assemblies and a plurality of second antenna assemblies arranged in an array, wherein each of the first antenna assemblies and the second antenna assemblies comprises the antenna assembly according to claim 1, wherein the main extension direction of the first slot of each of the plurality of first antenna assemblies is orthogonal to the main extension direction of the first slot of each of the plurality of second antenna assemblies, and a relative position of the transmitting port and the receiving port of each of the plurality of first antenna assemblies is opposite a relative position of the transmitting port and the receiving port of each of the plurality of second antenna assemblies.

10. The antenna array according to claim 9, wherein the antenna array is arranged in multiple columns, the plurality of first antenna assemblies are located in odd-numbered columns of the multiple columns, and the plurality of second antenna assemblies are located in even-numbered columns of the multiple columns.

11. The antenna array according to claim 9, wherein the plurality of first antenna assemblies and the plurality of second antenna assemblies are alternately arranged in columns and rows.

* * * * *